United States Patent [19]

Yoshida et al.

[11] Patent Number: 4,925,092
[45] Date of Patent: May 15, 1990

[54] HOT WATER SUPPLY SYSTEM UTILIZING EXHAUST GAS OF ENGINE

[75] Inventors: Hiroshi Yoshida, Nagoya; Hiroshi Ikeya, Kosai; Kunihiro Kobayashi, Nagano; Yasuhiko Kondo, Kasugai, all of Japan

[73] Assignee: Shinko Electric Co., Ltd., Tokyo, Japan

[21] Appl. No.: 353,309

[22] Filed: May 17, 1989

[30] Foreign Application Priority Data

| May 23, 1988 | [JP] | Japan | 63-123985 |
| May 23, 1988 | [JP] | Japan | 63-123986 |
| May 23, 1988 | [JP] | Japan | 63-123987 |
| May 23, 1988 | [JP] | Japan | 63-123988 |

[51] Int. Cl.$^5$ ............................................. B60H 1/02
[52] U.S. Cl. ............................ 237/12.3 B; 237/12.3 R
[58] Field of Search ............ 237/12.3 C, 12.1, 12.3 R, 237/12.3 B, 19, 53; 126/99 R

[56] References Cited

U.S. PATENT DOCUMENTS 4,065,055 12/1977 DeCosimo .......................... 237/12.1
4,606,399 8/1986 Zacuto ................................ 237/50 X

OTHER PUBLICATIONS

English Abstract of Japanese Laid–Open (Unexamined) Patent Publication No. 63-65252(A); Date: Mar. 23, 1988.

*Primary Examiner*—Henry A. Bennet
*Attorney, Agent, or Firm*—Armstrong, Nikaido, Marmelstein, Kubovcik & Murray

[57] ABSTRACT

A latent heat recovery apparatus includes a vessel having a top opening forming an exhaust port and upper and lower chambers divided by a filler layer of a porous member. Feed water is supplied and showered to the upper chamber, and exhaust gas from a gas engine is introduced into the lower chamber to heat the feed water in direct contact with the feed water thereby to produce warm water by recovering the latent heat of the exhaust gas. The warm water produced and stored in the bottom section of the latent heat recovery apparatus is supplied to a cooling water heat exchanger to reheat by cooling water of the gas engine to produce hot water to be supplied to a user. When a burner is mounted in an exhaust pipe of the gas engine, or in the lower chamber of the latent heat recovery apparatus as an auxiliary heat source, the amount of heat of the exhaust gas can be adjusted independent of the engine speed of the gas engine by heating the exhaust gas in the exhaust pipe or in the lower chamber thereby to maintain the temperature of the hot water at a constant level.

7 Claims, 7 Drawing Sheets

HOT WATER SUPPLY SYSTEM UTILIZING EXHAUST GAS OF ENGINE

BACKGROUND OF THE INVENTION

1. Field of the Invention

The present invention relates to a co-generation system, and in particular, to a hot water supply system utilizing exhaust gas of an engine.

2. Description of the Prior Art

Recently, a co-generation system has been used in which electric power is generated by using a driving force of an engine including a gas engine, diesel engine, gas turbine, or the like, and at the same time, hot water produced by utilizing the exhaust gas of the engine is supplied to a user.

Figure 1:
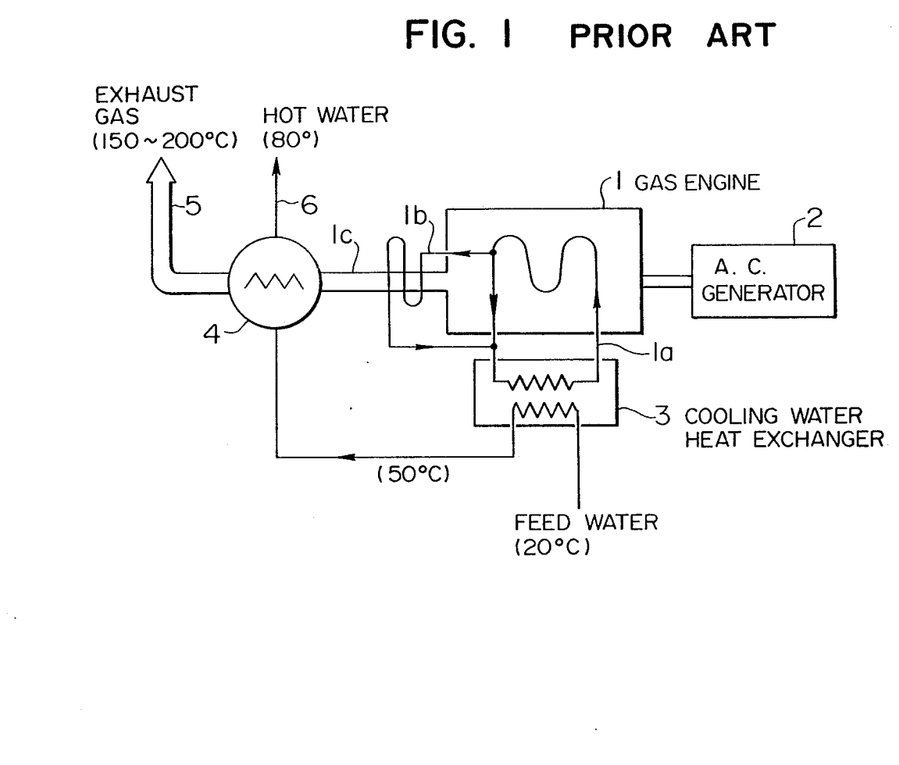
FIG. 1 is a system diagram of a prior art hot water supply system.

A prior art co-generation system comprises, as shown in FIG. 1, an engine 1, for example, a gas engine having a circulating path 1a for cooling water, a branch circulating path 1b, and an exhaust pipe 1c, an A.C. generator 2, a cooling water heat exchanger 3, and an exhaust gas exchanger 4. The exhaust gas heat exchanger 4 has an exhaust pipe 5 for exhaust gas, and a feed hot water pipe 6.

In the arrangement described above, the A.C. generator 2 is driven by the gas engine 1 and generates electric power, and at the same time, warm water produced as a result of cooling a high temperature portion of the engine 1 is used to warm city water in the cooling water heat exchanger 3 to produce warm water. The warm water is further supplied to the exhaust gas heat exchanger 4 to heat by the exhaust gas supplied through the exhaust pipe 1c thereby to use hot water produced therein as a hot water supply source.

Figure 2:
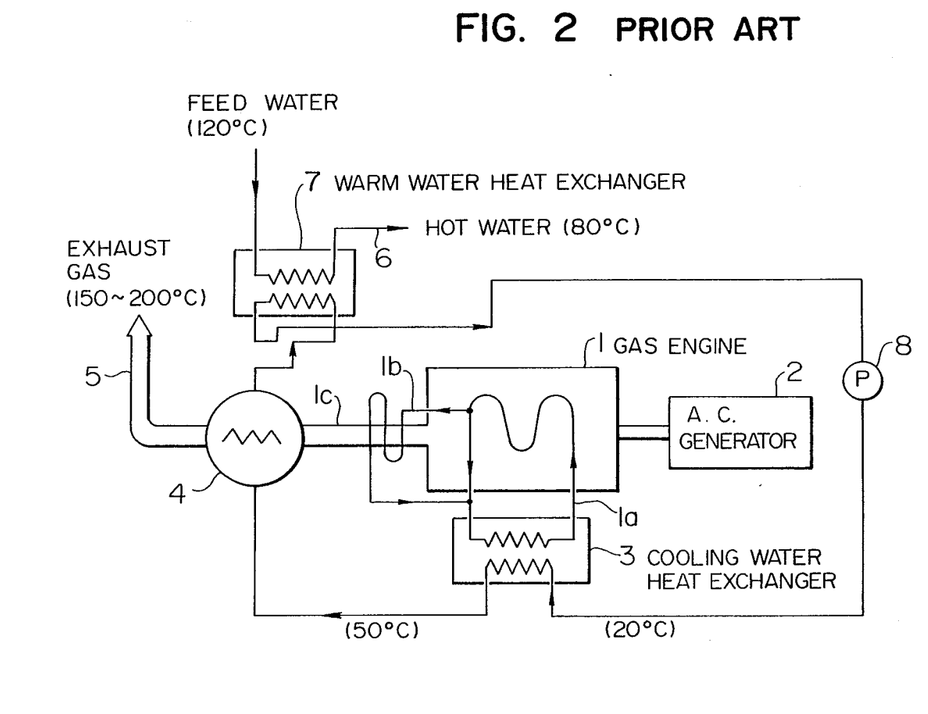
FIG. 2 is a system diagram of another prior art hot water supply system.

Furthermore, another prior art hot water supply system is shown in FIG. 2, in which as compared with the prior art system in FIG. 1, a warm water heat exchanger 7 and a warm water pump 8 are added to enable to supply potable warm water.

In this system, warm water produced by cooling a high temperature portion of an engine 1 is utilized to warm city water in a cooling water heat exchanger 3, and the warm water produced in the exchanger 3 is further supplied to an exhaust gas heat exchanger 4 to heat the warm water by exhaust gas supplied through an exhaust pipe 1c to produce hot water. The hot water is supplied to the warm water heat exchanger 7 and used as a heat source to heat city water to produce potable hot water for hot water supply to a user.

In this case, the warm water in the primary side of the warm water heat exchanger 7 after being used as the beat source In the warm water heat exchanger 7 is supplied to the cooling water heat exchanger 3 through a warm water pump 8 to utilize again as feed water to the cooling water heat exchanger 3.

In the prior art system described above, as a means for recovering heat from the exhaust gas containing a great amount of heat generated by the engine 1, the exhaust gas heat exchanger 4 which is a heat exchanger of a gas/water indirect type has been used primarily.

As a result, when the heat recovery is to be performed by directly supplying feed water of 20° C. to the exhaust gas heat exchanger 4, the exhaust pipe 5 of the heat exchanger 4 will be corroded at low temperature due to dropwise condensation or sweating caused by a large temperature difference. Accordingly, to avoid this, the feed water is preheated in the cooling water heat exchanger 3 up to about 50° C., and furthermore, the preheated feed water is heated in the exhaust gas heat exchanger 4 to produce hot water of 80° C. to be used as the hot water supply in the system in FIG. 1. On the other hand, in the system in FIG. 2, the hot water produced in the exhaust gas heat exchanger 4 is used as the heat source for the warm water heat exchanger 7 to produce the potable hot water of 80° C. to be supplied to the user.

In the prior art systems, since the exchange system of the gas/water indirect type is employed, evaporation latent heat in the great amount of heat of the exhaust gas can not be recovered, and it is exhausted as water vapour, carbonic acid gas, etc. Moreover, the temperature of the exhaust gas to be discharged is limited to a temperature of 150°-200 ° C. in order to prevent the low temperature corrosion. Consequently, the heat efficiency of the overall system has been limited to about 80% even at the maximum.

Furthermore, in the indirect system, since a heat transfer area of the heat exchanger becomes large when a temperature of the gas approaches a temperature of the water, the indirect system is not practical.

Moreover, in the prior art systems, a problem is involved in that it has been impossible to decrease the output or engine speed of the engine when it is required to maintain the amount of heat of the hot water to be supplied at constant, even when small electrical power of the generator is demanded, or the engine speed is permitted to be decreased in relation to the load. Thus, the balancing between the electrical power demanded to the generator and the heat energy required for the heat exchanger is difficult. As a countermeasure to such a problem, an auxiliary boiler has been used to compensate for a decrease of the amount of heat due to a decrease in the output or speed of the engine. However, since the auxiliary boiler is needed additionaly, the overall system becomes large, and the installation are is also increased.

In addition, in the prior art systems, since the warm water heat exchanger is installed in the path before the hot water supply source to the user in order to produce potable hot water, additional piping for this purpose is needed and additional installation area is needed.

SUMMARY OF THE INVENTION

It is an object of the present invention to provide a hot water supply system utilizing exhaust gas of an engine which improves the heat efficiency of the system by recovering the latent heat of the exhaust gas which has been impossible to recover in the prior art system.

It is another object of the present invention to provide a hot water supply system which enables to adjust the amount of heat supplied by the exhaust gas independent of the load of the engine and which enables to maintain the amount of heat of the hot water to be supplied at constant.

It is another object of the present invention to provide a hot water supply system which resolves the problem in the prior art requiring a large installation area for a hot water heat exchanger installed in a path before a hot water supply in order to produce potable hot water.

In a hot water supply system in the present invention, the amount of heat contained in exhaust gas of an engine is recovered in a latent heat recovery apparatus to the extent that the temperature of the exhaust gas drops substantially to an atmospheric temperature, and the warm water thus produced is again heated in a cooling water heat exchanger using cooling water of the engine as a heat source to produce hot water to be supplied to a user.

DESCRIPTION OF THE PREFERRED EMBODIMENTS

A first embodiment of the invention will be described with reference to FIG. 3 in which identical parts with those in FIG. 1 are indicated by identical reference numerals and descriptions thereof are omitted.

A latent heat recovery apparatus 9 includes a vessel 9a, and a top opening thereof is connected to an exhaust pipe 11. A feed water pipe 10 has a bibcock 10a located at an upper portion of the vessel 9a, and showers fed water from a feed water source 100 into the vessel 9a. A filler layer 12 is provided at an intermediate portion of the vessel 9a below the bibcock 10a to divide the vessel 9a into an upper chamber and a lower chamber. The filler layer 12 is formed by a porous member including a heat resistant metallic plate having many holes, or many stainless steel pipes arranged horizontally in parallel to one another so that the feed water showered on the filler layer 12 is permitted to pass therethrough downwardly and exhaust gas supplied below the filler layer 12 is permitted to pass upwardly. An exhaust gas supply pipe 14 has an end opening protruding into the vessel 9a through a side wall thereof so that the end opening is located below the filler layer 12, and has the other end connected to an exhaust pipe 1c to supply exhaust gas into the vessel 9a from a gas engine (or gas turbin, diesel engine, etc.) 1. When the engine has four cylinders, the exhaust pipe 1c may be formed by a manifold connected to four exhaust ports and having a single supply port. A bottom portion of the vessel 9a forms a warm water storage section 13.

Furthermore, a warm water pump 15 is additionally provided to supply the warm water stored in the storage section 13 to a primary side of a cooling water heat exchanger 3, and another warm water pump 16 is also additionally provided in a circulating path 1a of cooling water.

In this embodiment, as compared with the aforedescribed prior art systems, the latent heat recovery apparatus 9 is provided to recover the amount of heat contained in the exhaust gas to the extent that the temperature of the exhaust gas drops to an atmospheric temperature, and the obtained warm water is reheated in the cooling water heat exchanger 3 to produce hot water to be supplied to a user. In other words, a heat route is formed in the order of the gas/water heat exchanger 9 and the water/water heat exchanger 3. Furthermore, in FIG. 3, the numerals following characters Hj, Hg, and Hw represent respectively examples of amounts of heat generated at the gas engine 1, latent heat exchange apparatus 9, and hot water supply source 300. Examples of temperatures at various portions are also indicated in FIG. 3.

In operation, the gas engine 1 drives an A.C. generator 2 to generate electrical power, and the exhaust gas of about 500° C. containing a great amount of heat discharged from the gas engine 1 is supplied into the latent heat recovery apparatus 9 through the exhaust gas supply pipe 14. In this condition, when city water of 20° C. is supplied from a feed water source 100 into the latent heat recovery apparatus 9 through the feed water pipe 10 and the bibcock 10a, the showered city water is brought into directly contact with the exhaust gas within the vessel 9a in the upper chamber, in the filler layer 12, and in the lower chamber to heat the city water by a so-called latent heat recovery method. As a result, warm water of 52° C. is produced and stored in the warm water storage section 13. The warm water is further supplied to the cooling water heat exchanger 3 through the pump 15, and is reheated up to 80° C. to be supplied to the user through a feed hot water pipe 6.

Figure 3:
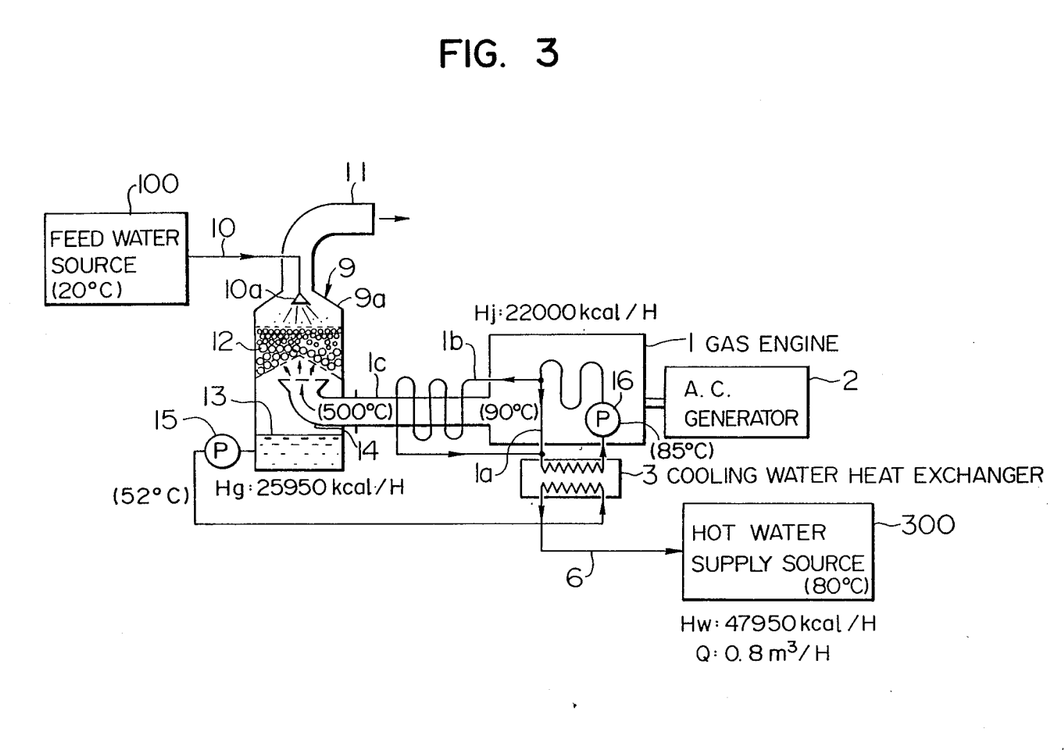
FIG. 3 is a system diagram of a first embodiment of the present invention.
Figure 4:
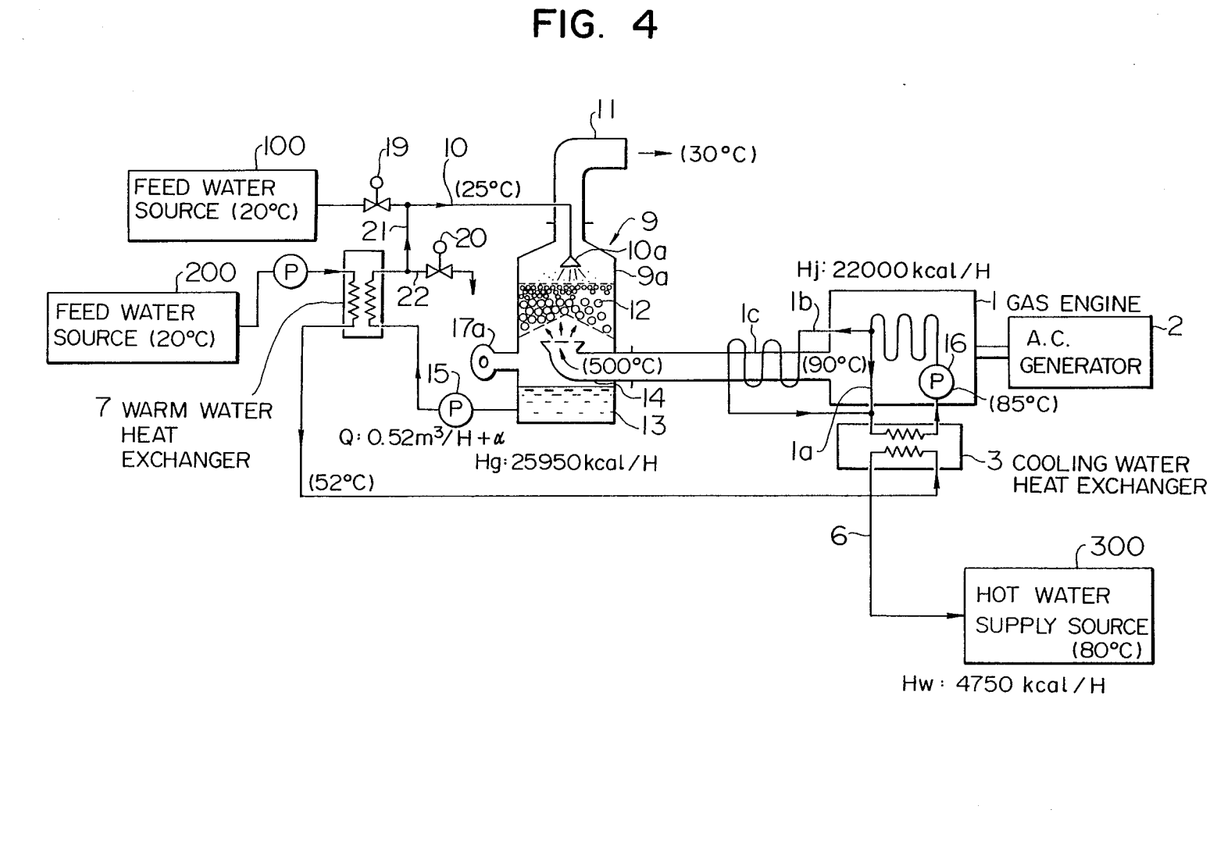
FIG. 4 is a system diagram of a second embodiment of the present invention.

A second embodiment is shown in FIG. 4, in which identical parts to those in FIG. 3 are indicated by identical reference numerals and descriptions thereof are omitted.

In this embodiment, as compared with the first embodiment, a warm water heat exchanger 7 is additionally provided between a latent heat recovery apparatus 9 and a cooling water heat exchanger 3. Specifically, the warm water heat exchanger 7 receives at a primary side thereof warm water from a warm water storage section 13 of the latent heat recovery apparatus 9 as a heat source, and receives at a secondary side thereof city water of 20° C. form a feed water source 200 through a pump 18 to produce warmed city water, i.e., clean warm water of 52° C. The clean warm water is supplied to the cooling water heat exchanger 3 for reheating. Furthermore, most of the warm water supplied to the primary side of the warm water heat exchanger 7 is introduced into a branch pipe 21 after transferring its heat to the secondary, and this warm water of 25° C. is used again as the feed water to the latent heat recovery apparatus 9 together with the feed water from a feed water source 100. However, when the warm water from the primary side is too acidic, or the warm water is produced in the recovery apparatus 9 excessively, such warm water is drained through a branch pipe 22 from a solenoid valve 22. Since the feed water is made to circulate from the primary side of the warm water exchanger 7 to the latent heat recovery apparatus 9, the feed water to the latent heat recovery apparatus 9 is required only at an initial stage, and thereafter, the supply of the feed water can be saved substantially.

In this embodiment, the amount of heat contained in the exhaust gas is recovered in the latent heat recovery apparatus to the extent that the temperature of the exhaust gas drops to an atmospheric temperature, and the obtained warm water is converted to clean warm water in the warm water exchanger 7, and furthermore, the clean warm water is reheated in the cooling water heat exchanger 3 utilizing the engine cooling water to produce hot water to be supplied to the user. Thus, a heat utilization route is formed in the order of the latent heat recovery apparatus 9 to the warm water/water exchanger 7 and to the water/water heat exchanger 3.

In operation when the exhaust gas of 500° C. containing a great amount of heat is supplied to the latent heat recovery apparatus 9 through an exhaust gas supply pipe 14, and when city water of 20° C. is supplied to the latent heat recovery apparatus 9 from the feed water source 100 through a feed pipe 10, the city water is brought into direct contact with the exhaust gas within the latent heat exchange apparatus 9, and warm water of 52° C. is produced by a so-called latent heat recovery method and stored in a warm water storage section 13. The warm water is supplied to the warm water exchanger 7 through a warm water pump 15 and converts city water of 20° C. supplied from a feed water source 200 to clean warm water of 52° C. The clean warm water is supplied to the cooling water heat exchanger 3 and reheated up to 80° C. thereby to supply through a feed hot water pipe 6 to the user.

Figure 5:
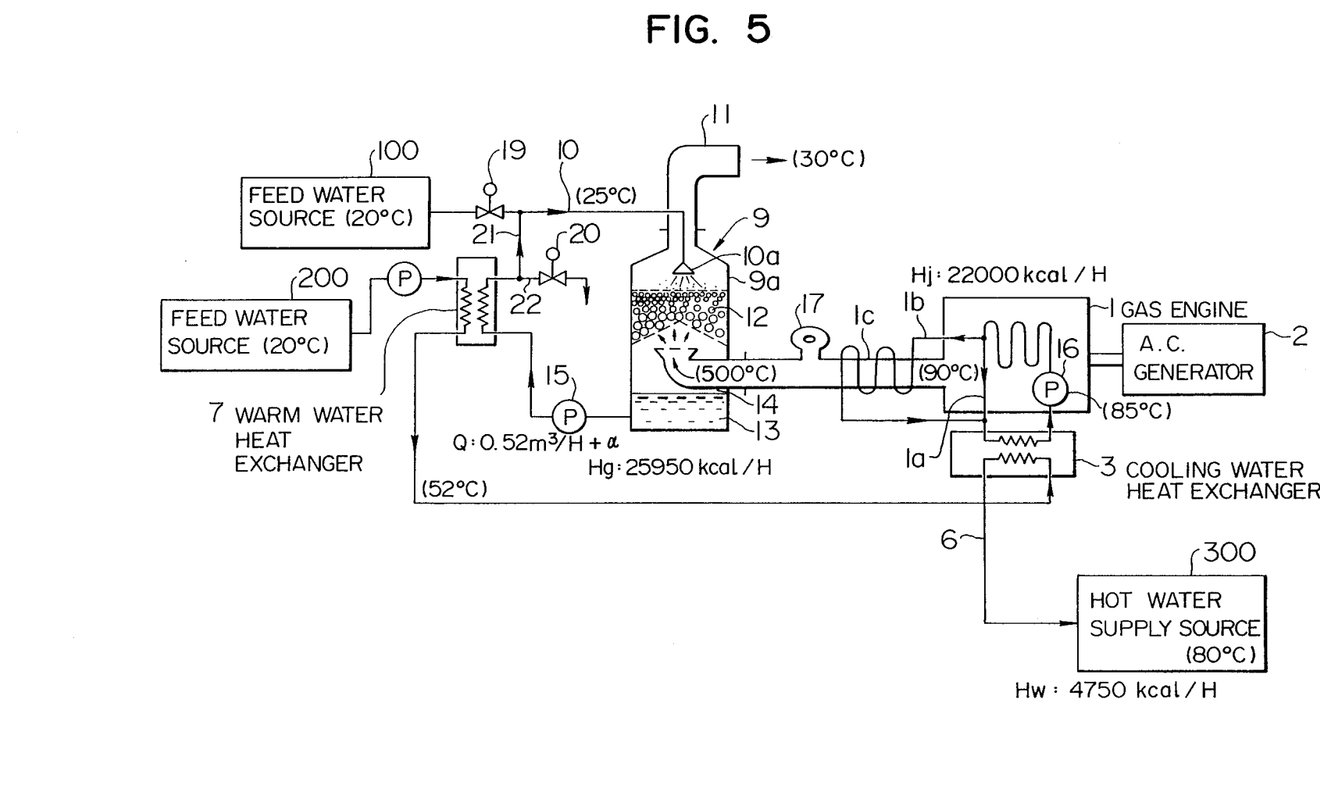
FIG. 5 is a system diagram of a third embodiment of the present invention.

A third embodiment is shown in FIG. 5 and in part in FIG. 4, in which identical parts to those in FIG. 3 are indicated by identical reference numerals and descriptions thereof are omitted.

In the third embodiment, an auxiliary heat source 17 including a burner or the like is provided in an exhaust pipe 1c (FIG. 5), and another auxiliary heat source 17a including a burner is provided at a bottom portion of the latent heat recovery apparatus 9 (FIG. 4). The burners 17 and 17a are auxiliary heat sources for the heat of the exhaust gas of a gas engine 1, and the amount of heat generated by these burners 17 and 17a can be adjusted at will by adjusting the flames thereof.

Accordingly, in the latent heat recovery apparatus 9, the amount heat of warm water in a storage section 13 of a latent heat recovery apparatus 9 can be maintained at a constant level by the burners 17 and 17a even when the engine speed of the gas engine 1 is reduced due to a reduced load and the temperature of the exhaust gas is lowered. As a result, in a warm water heat exchanger 7, the temperature of the warm water supplied to a primary side is maintained at constant by the additional auxiliary heat source, and thus city water of 20° C. supplied to a secondary side from a feed water source 200 is converted to clean warm water of 52° C. effectively. Most of the warm water of 25° C. (dropped to this temperature) passing through the primary side of the warm water heat exchanger 7 after heating is supplied to the latent heat recover apparatus 9 through a branch pipe 21 to utilize again, and a part of the warm water which is too acidic, or which is produced excessively in the latent heat recovery apparatus 9 is drained from a solenoid valve or regulator valve 20 through another branch pipe 22.

In this embodiment, since the amount of heat generated by the auxiliary heat sources or burners 17 and 17a can be adjusted independent of the engine speed of the gas engine 1, even when the engine speed of the gas engine 1 is decreased because of a reduced load, the amount of heat of the hot water to be supplied to the user can be maintained at a predetermined value by adjusting the amount of heat generated by the auxiliary burners 17 and 17a.

Figure 6:
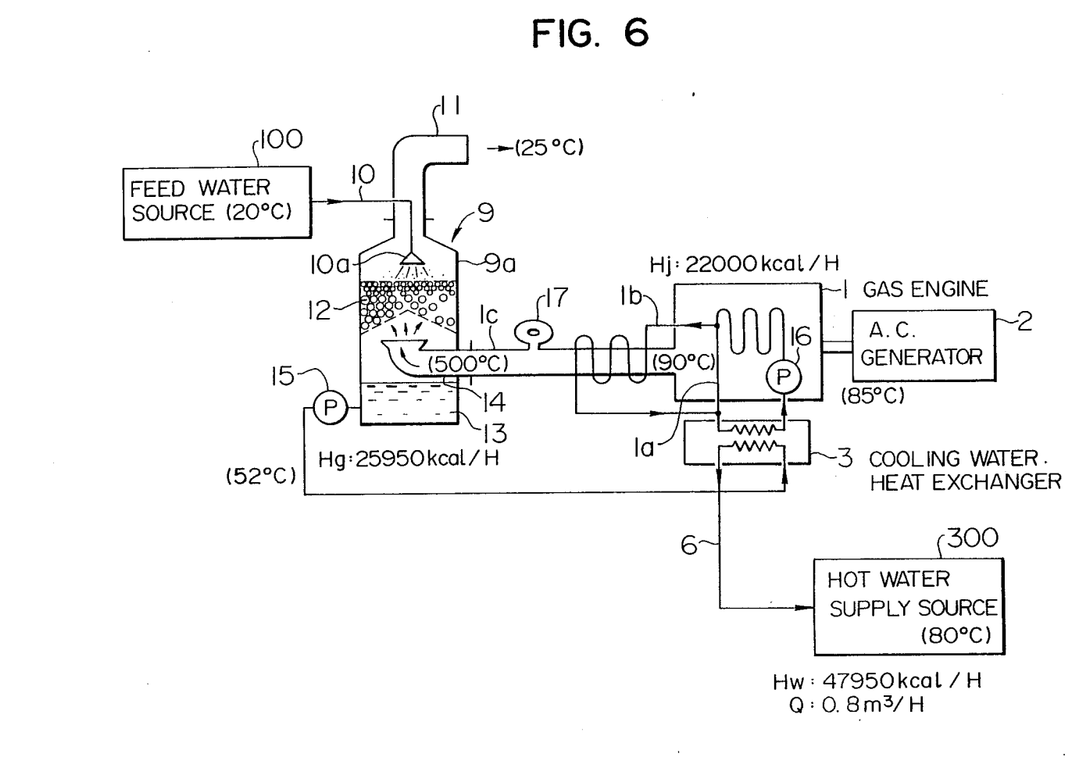
FIG. 6 is a system diagram of a fourth embodiment of the present invention.

A fourth embodiment is shown in FIG. 6, in which identical part with those in FIG. 3 are indicated by identical reference numerals and the descriptions thereof are omitted.

In the fourth embodiment, as compared with the third embodiment, the feed water source 200 and the warm water heat exchanger 7 shown in FIG. 6 are removed, and instead thereof, warm water stored in a storage section 13 of a latent heat recovery apparatus 9 is supplied to a cooling water heat exchanger 3 through a warm water pump 15 as is the case in FIG. 3, and the warm water is directly heated in the heat exchanger 3 to produce hot water to be supplied to the user. An auxiliary heat source 17 including a burner mounted in an exhaust pipe 1c is used as in the third embodiment so that the exhaust gas from the gas engine 1 is heated to compensate for a decrease in the engine speed when a load of the gas engine 1 is decreased.

Accordingly, the amount of heat contained in the exhaust gas is recovered in the latent heat recovery apparatus 9 to the extent that the temperature of the exhaust gas drops to an atmospheric temperature, and at the same time, a decrease in the amount of heat in the exhaust gas is compensated by using the burner 17 as an auxiliary heat source when the engine speed is decreased. The warm water obtained by the latent heat recovery apparatus 9 at the storage section 13 thereof is reheated in the cooling water heat exchanger 3 to produce the hot water.

As a result, in this embodiment, when the hot water is not required to be potable, it is possible to produce and supply the hot water by a hot water supply system with a simple structure and at low cost.

Figure 7:
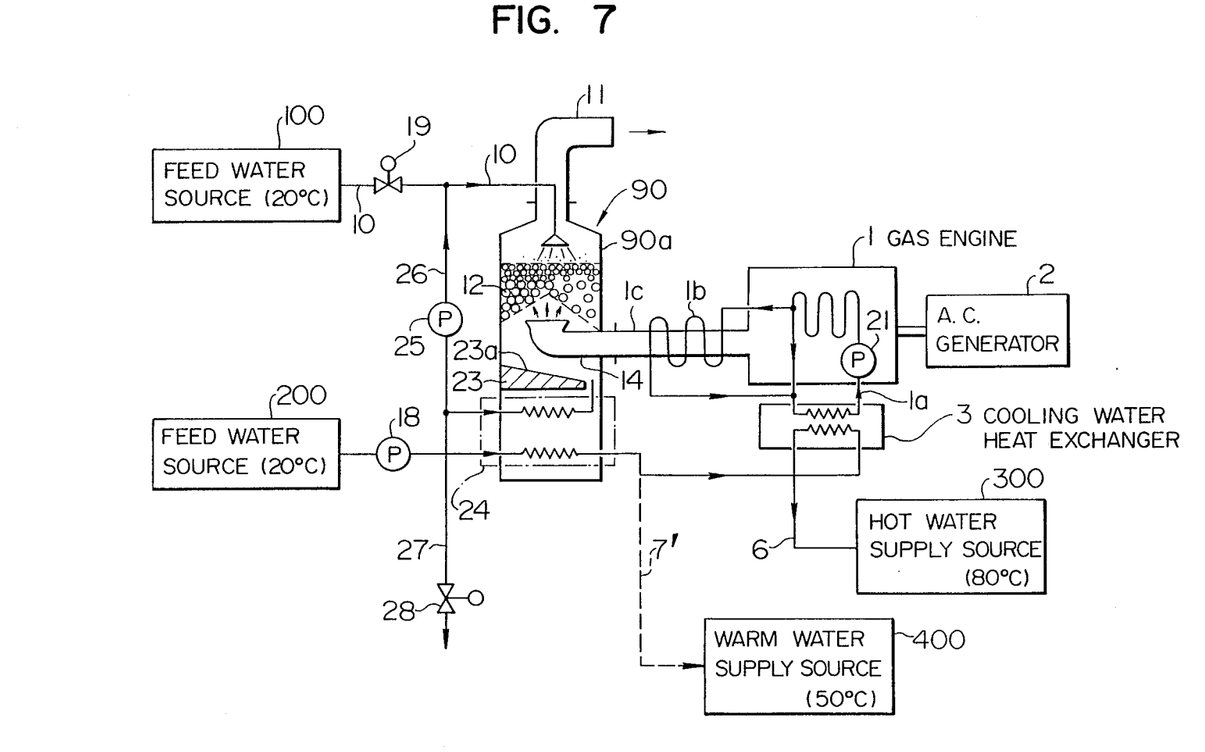
FIG. 7 is a system diagram of a fifth embodiment of the present invention.

A fifth embodiment is shown in FIG. 7, in which identical parts with those in FIG. 3 are indicated by identical reference numerals and descriptions thereof are omitted.

A latent heat recovery apparatus 90 is the same in its structure as in the previous embodiments with the exception that a receiving plate 23 having a slant surface 23a is provided below an exhaust gas supply pipe 14, and a warm water heat exchanger 24 is provided at a bottom portion of a vessel 90a below the receiving plate 23 in place of the warm water storage section 13. The receiving plate 28 receives and collect at the slant surface 23a the warm water heated by the exhaust gas supplied from the exhaust gas supply pipe 14, and sends or allow to flow into a primary side of the warm water heat exchanger 24. In this case, in place of the slant surface 23a, a plurality of through holes may be formed in the receiving plate 23.

The warm water heat exchanger 24 uses as a heat source the warm water produced within the latent heat recovery apparatus 90 at a portion above the receiving plate 23, and heats city water of 20° C. supplied (from a feed water source 200 to produce clean warm water of 52° C. The clean warm water is supplied to a cooling water heat exchanger 3 to reheat and produce hot water of 80° C. The warm water from the primary side of the warm water heat exchanger 24 after heating is mostly supplied to the latent heat recovery apparatus 90 through a pump 25 and a branch pipe 26 to utilize as feed water (the temperature is about 25° C.) thereto. On the other hand, when the warm water from the secondary is too acidic, or is produced excessively in the latent heat recovery apparatus 90, such warm water is drained from a regulator valve 28 through a branch pipe 27.

In this embodiment, the warm water produced by recovering the amount of heat contained in the exhaust gas in the latent heat recovery apparatus 90 to the extent that the temperature of the exhaust gas drops to an atmospheric temperature, and the warm water is converted to clean warm water in the warm water heat exchanger 24, and further, the clean warm water is reheated up to 80° C. in a cooling water heat exchanger 3 if necessary. Thus, the clean warm water of 50° C.

may be supplied to the user through a feed warm water pipe 70.

In the fifth embodiment, the arrangement is substantially the same as the second embodiment in FIG. 4, however, the warm water heat exchanger 24 is assembled in a bottom portion of a vessel 90a of the latent heat recovery apparatus 90 to simplify the structure.

As described in the foregoing, in the present invention, basically, a latent heat recovery apparatus is used as a gas/water heat exchanger utilizing exhaust gas, and the warm water obtained by this latent heat recovery apparatus is reheated by a cooling water heat exchanger. By virtue of this arrangement, the following advantages are provided:

Most of the amount of heat of the exhaust gas is recovered in the latent heat recovery apparatus, and the warm water from the latent heat recovery apparatus is reheated in the cooling water heat exchanger in which the amount of heat in the jacket of the engine is recovered. Thus, the evaporation latent heat of the exhaust gas which has been impossible to be recovered in the prior art can be utilized. The heat efficiency is improved to a great extent up to 90 to 95%.

In the latent heat recovery apparatus, the feed water supplied thereto is brought into direct contact with the exhaust gas. As a result, the temperature of the exhaust gas discharged form the exhaust pipe substantially drops to a temperature of the feed water supplied to the latent heat recovery apparatus. Furthermore, since the condensed water in the exhaust gas is diluted, the low temperature corrosion of the exhaust pipe due to the condensed water (acidic water) can be prevented. Moreover, it is possible to dispense with a countermeasure for preventing acid etching due to the discharge of the exhaust gas of high temperature.

The noise generated by the engine is absorbed within the latent heat recovery apparatus, in particular by the filler layer, the showered water, etc., there is no need to attach a muffler at the opening end of the exhaust pipe. Accordingly, the system becomes compact, and the installation area of the overall system can be reduced to a smaller space.

Owing to the filler layer in the latent heat recovery apparatus, soot and dust contained in the exhaust gas can be removed, and furthermore, the concentration of the soot and dust can be reduced by the shower effect of the bibcock.

In the arrangement in the second embodiment shown in FIG. 4, the hot water produced ultimately is made to be clean hot water potable by the aid of the warm water heat exchanger.

In the case, in which the amount of heat of the exhaust gas is made adjustable or compensatable by using the auxiliary heat source additionally as shown in FIGS. 4, 6, and 6, the temperature of the hot water to be supplied to the user can be raised further, or the amount of heat of the hot water can be adjusted independent of the engine speed. Accordingly, when the generated electrical power is allowed to be reduced due to a reduced load, the engine speed of the engine can be decreased thereby to achieve saving of energy.

Furthermore, when the warm water heat exchanger is installed at the bottom of the latent heat recovery apparatus as shown in FIG. 7, the length and number of pipings can be reduced to a great extent as compared with the separate installation of the warm water heat exchanger in the prior art. In addition, the installation area also can be reduced, and the overall system becomes compact.

What is claimed:

1. A hot water supply system utilizing exhaust gas of an engine comprising:
   an exhaust gas supply pipe having one end connected to an exhaust pipe of said engine for introducing the exhaust gas;
   a feed water source for supplying city water through a feed water pipe;
   a latent heat recovery apparatus including a vessel having a top opening forming an exhaust port and having a warm water storage section at a bottom portion, and a filler layer of a porous member formed at an intermediate portion of said vessel to divide said vessel into an upper chamber and a lower chamber, said feed water pipe having an end protruding into said upper chamber to shower the city water above said filler layer, said exhaust gas supply pipe having the other end protruding into said lower chamber to supply the exhaust gas below said filler layer thereby to heat the city water by the exhaust gas and to store warm water thus produced in the warm water storage section; and
   a cooling water heat exchanger having a primary side fed with cooling water of said engine as a heat source and having a secondary side supplied with the warm water from the storage section of said latent heat recovery apparatus to reheat the warm water to produce hot water to be supplied to a user.

2. A system according to claim 1, further comprising a warm water heat exchanger having a primary side connected to the warm water storage section of said latent heat recovery apparatus as a heat source and having a secondary side connected between a feed water source and the secondary of said cooling water heat exchanger thereby to heat city water from said feed water source and further reheat warm water produced by said warm water heat exchanger by said cooling water heat exchanger to produce hot water to be supplied to the user.

3. A system according to claim 1, further comprising an auxiliary heat source mounted in said exhaust pipe of said engine to heat the exhaust gas to compensate for a variation in the amount of heat of the exhaust gas due to a variation in engine speed of said engine.

4. A system according to claim 1, further comprising an auxiliary heat source mounted in the lower chamber of said latent heat recovery apparatus to heat the exhaust gas supplied thereto to compensate for a variation in the amount of heat of the exhaust gas due to a variation in engine speed of said engine.

5. A system according to claim 3 or 4, wherein said auxiliary heat source includes a burner, the amount of heat generated by said burner being adjustable by adjusting flames thereof.

6. A hot water supply system utilizing exhaust was of an engine comprising:
   an exhaust gas supply pipe having one end connected to an exhaust pipe of said engine for introducing the exhaust gas;
   a feed water source for supplying city water through a feed water pipe; and
   a latent heat recovery apparatus including a vessel having a top opening forming an exhaust port, a filler layer of a porous member formed at an intermediate portion of said vessel, said feed water pipe having an end protruding into said vessel to shower the city water above said filler layer, said exhaust gas supply pipe having the other end protruding into said vessel to supply the exhaust gas below said filler layer thereby to heat the city water by the exhaust gas, a receiving plate having a slant upper surface provided in said vessel below said exhaust gas supply pipe to receive and collect warm water produced in said vessel, and a warm water heat exchanger mounted on a bottom portion of said vessel below said receiving plate, said warm water heat exchanger having a primary side fed with the warm water collected by said receiving plate as a heat source and having a secondary side supplied with city water from a further feed water source to heat the city water to produce clean warm water to be supplied to a user.

7. A system according to claim 6, further comprising a branch pipe having one end connected to said primary side of said warm water heat exchanger and having the other end connected to said feed water pipe from said first feed water source thereby to circulate the warm water of said primary side to use as the feed water to said latent heat recovery apparatus.

* * * * *